US008626497B2

(12) United States Patent
Lin

(10) Patent No.: US 8,626,497 B2
(45) Date of Patent: Jan. 7, 2014

(54) AUTOMATIC MARKING METHOD FOR KARAOKE VOCAL ACCOMPANIMENT

(76) Inventor: Wen-Hsin Lin, Taichung (TW)

( * ) Notice: Subject to any disclaimer, the term of this patent is extended or adjusted under 35 U.S.C. 154(b) by 180 days.

(21) Appl. No.: 13/258,875

(22) PCT Filed: Apr. 7, 2009

(86) PCT No.: PCT/CN2009/071176

§ 371 (c)(1), (2), (4) Date: Sep. 22, 2011

(87) PCT Pub. No.: WO2010/115298

PCT Pub. Date: Oct. 14, 2010

(65) Prior Publication Data

US 2012/0022859 A1 Jan. 26, 2012

(51) Int. Cl.
*G01L 11/04* (2006.01)

(52) U.S. Cl.
USPC ............. 704/207; 704/218; 704/278; 84/609; 84/610; 84/613; 84/649; 700/94

(58) Field of Classification Search
USPC ................. 704/207, 218, 270, 278, 240, 217; 84/609, 610, 613, 478, 649; 700/94
See application file for complete search history.

(56) References Cited

U.S. PATENT DOCUMENTS

| | | | | |
|---|---|---|---|---|
| 5,682,502 | A * | 10/1997 | Ohtsuka et al. | 704/267 |
| 5,693,903 | A * | 12/1997 | Heidorn et al. | 84/668 |
| 5,719,344 | A * | 2/1998 | Pawate | 84/609 |
| 5,804,752 | A * | 9/1998 | Sone et al. | 84/610 |
| 5,806,039 | A * | 9/1998 | Fukada et al. | 704/268 |
| 5,889,224 | A * | 3/1999 | Tanaka | 84/645 |
| 5,913,259 | A * | 6/1999 | Grubb et al. | 84/610 |
| 6,015,949 | A * | 1/2000 | Oppenheim et al. | 84/613 |
| 6,226,606 | B1 * | 5/2001 | Acero et al. | 704/218 |
| 6,232,540 | B1 * | 5/2001 | Kondo | 84/612 |
| 8,294,016 | B2 * | 10/2012 | Franzblau | 84/609 |
| 2006/0246407 | A1 * | 11/2006 | Kang et al. | 434/307 A |
| 2007/0163425 | A1 * | 7/2007 | Tsui et al. | 84/609 |
| 2008/0148924 | A1 * | 6/2008 | Tsui et al. | 84/618 |
| 2008/0300702 | A1 * | 12/2008 | Gomez et al. | 700/94 |

FOREIGN PATENT DOCUMENTS

| | | | |
|---|---|---|---|
| CN | 1173008 | A | 2/1998 |
| CN | 1178357 | A | 4/1998 |
| CN | 101364407 | A | 2/2009 |
| JP | 2000181466 | A | 6/2000 |
| JP | 2002162978 | A | 6/2002 |
| JP | 2002175086 | A | 6/2002 |
| JP | 2002278570 | A | 9/2002 |
| JP | 2006031041 | A | 2/2006 |
| WO | 2006115387 | A | 11/2006 |

OTHER PUBLICATIONS

Search Report for corresponding WIPO Application PCT/CN2009/071176.

* cited by examiner

*Primary Examiner* — Vijay B Chawan
(74) *Attorney, Agent, or Firm* — Egbert Law Offices, PLLC

(57) ABSTRACT

An automatic marking method for Karaoke vocal accompaniment is provided. In the method, pitch, beat position and volume of a singer are compared with the original pitch, beat position and volume of the theme of a song to generate a score of pitch, a score of beat and a score of emotion respectively, so as to obtain a weighted total score in a weighted marking method. By using the method, the pitch, beat position and volume error of each section of the song sung by the singer can be exactly worked out, and a pitch curve and a volume curve can be displayed, so that the singer can learn which part is sung incorrectly and which part needs to be enhanced. The present invention also has the advantages of dual effects of teaching and entertainment, high practicability and technical advancement.

2 Claims, 13 Drawing Sheets

AUTOMATIC MARKING METHOD FOR KARAOKE VOCAL ACCOMPANIMENT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an automatic marking method for Karaoke vocal accompaniment, and more particularly to an innovative design, obtaining a score by calculating the score of pitch, score of beat and score of emotion respectively, and finally the weighted total score in a weighted marking method.

2. Description of Related Art Including Information Disclosed Under 37 CFR 1.97 and 37 CFR 1.98.

At present, during Karaoke vocal accompaniment, although the vocal accompaniment machine usually contains an automatic marking function, it is known as either a rough total score calculation, or a result from vocal decibel value. Even more, some other marking result does no business with the quality and status of the melody itself. Therefore, it is a way only for entertainment, not to evaluate the melody quality, and finally does no good for singers practicing to improve singing skills.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The present invention aims to provide an automatic marking method for Karaoke vocal accompaniment, so as to help singers improve their singing skills which are difficult to realize from those Karaoke vocal accompaniment machines with a marking functions unable to evaluate the quality of the melody itself.

The characteristics of the present invention lie in its automatic marking method for Karaoke vocal accompaniment. In the method, pitch, beat position and volume of a singer are compared with the original pitch, beat position and volume of the theme of a melody to generate a score of pitch, a score of beat and a score of emotion respectively, so as to obtain a weighted total score in a weighted marking method. By using the method, the pitch, beat position and volume error of each section of the melody sang by the singer can be exactly worked out, and a pitch curve and a volume curve can be obviously displayed, so that the singer can learn which part is sung incorrectly and which part needs to be enhanced. The present invention also has the advantages of dual effects of teaching and entertainment, high practicability and technical advancement.

The present invention provides an automatic marking method for Karaoke vocal accompaniment. In the method, pitch, beat position and volume of a singer are compared with the original pitch, beat position and volume of the theme of a song to generate a score of pitch, a score of beat and a score of emotion respectively, so as to obtain a weighted total score in a weighted marking method. By using the method, the pitch, beat position and volume error of each section of the song sang by the singer can be exactly worked out, and a pitch curve and a volume curve can be obviously displayed, so that the singer can learn which part is sung incorrectly and which part needs to be enhanced. The present invention also has the advantages of dual effects of teaching and entertainment, high practicability and technical advancement.

Although the present invention has been explained in relation to its preferred embodiment, it is to be understood that many other possible modifications and variations can be made without departing from the spirit and scope of the present invention as hereinafter claimed.

DETAILED DESCRIPTION OF THE INVENTION

FIGS. 1-16 show some preferred embodiments of the automatic marking method for Karaoke vocal accompaniment, but it shall be noted that these figures are only for reference and explanation, and shall not limit the patent application. In the automatic marking method for Karaoke vocal accompaniment, pitch, beat position and volume of a singer are compared with the original pitch, beat position and volume of the theme of a melody to generate a score of pitch, a score of beat and a score of emotion respectively, so as to obtain a weighted total score in a weighted marking method.

During singing, apart from the sound specialty, the match degree between the singing sound and the melody shall also be evaluated by three sensations, pitch sensation, beat sensation and emotion sensation respectively. Pitch sensation is a way to judge the accuracy between the pitch and pitch of each relevant note. Beat sensation is to judge the error of the beat position, including beat start position and beat end position. Emotion is to judge the change of the volume, including the volume change of each lyric and the whole melody. The specific methods for obtaining the above mentioned score of pitch, score of beat and score of emotion are as follows:

(1) Score of Pitch

Figure 1:
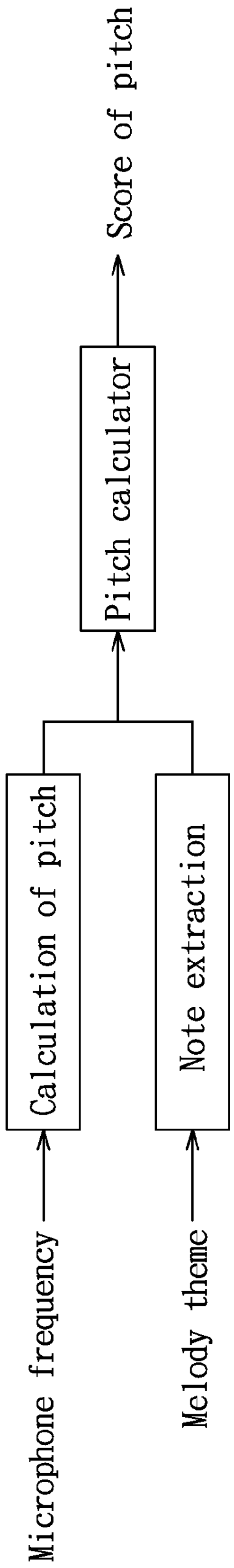
FIG. 1 is a first schematic diagram of the method to obtain score of pitch of the present invention.
Figure 2:
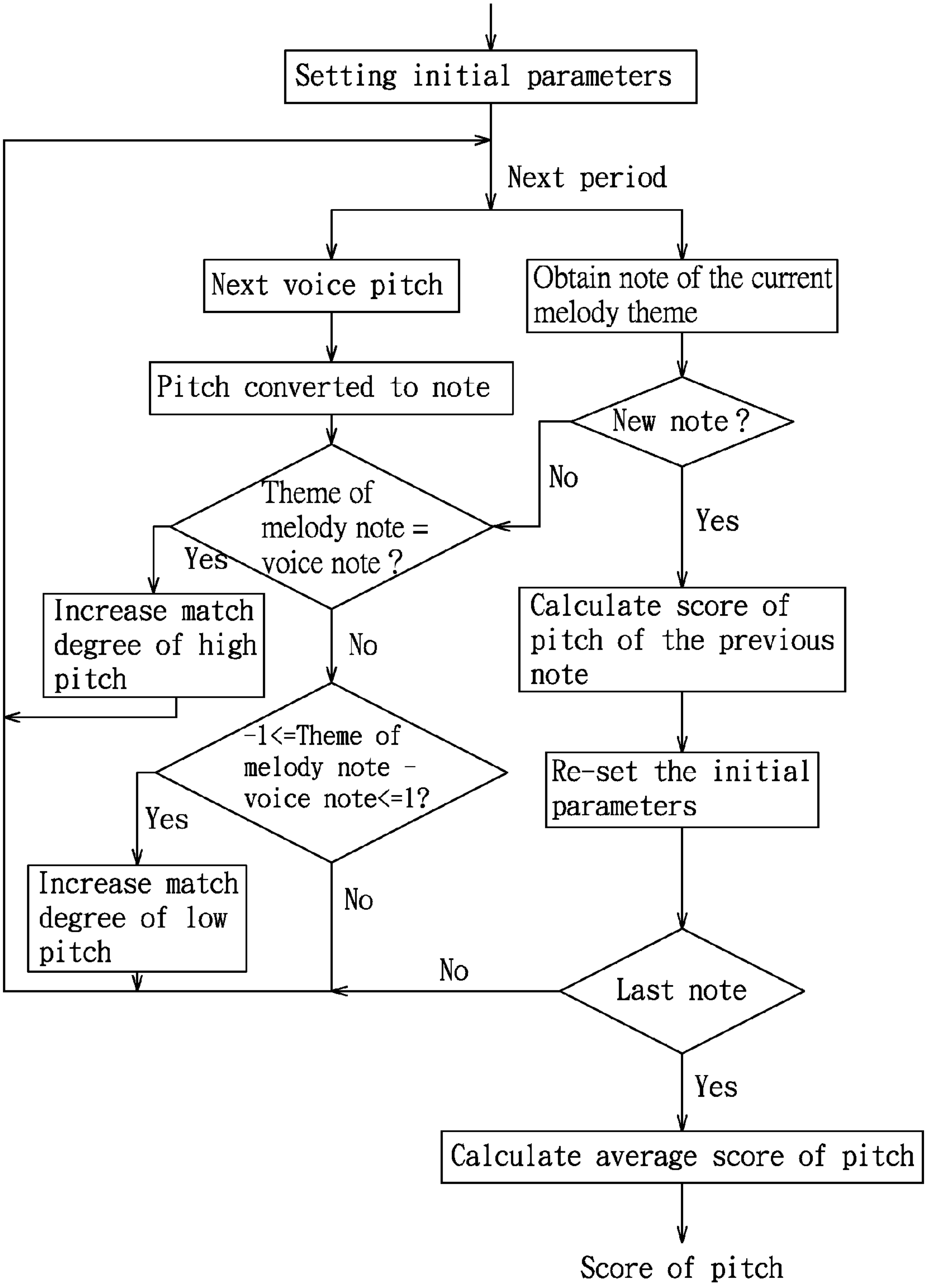
FIG. 2 is a second schematic diagram of the method to obtain score of pitch of the present invention.
Figure 3:
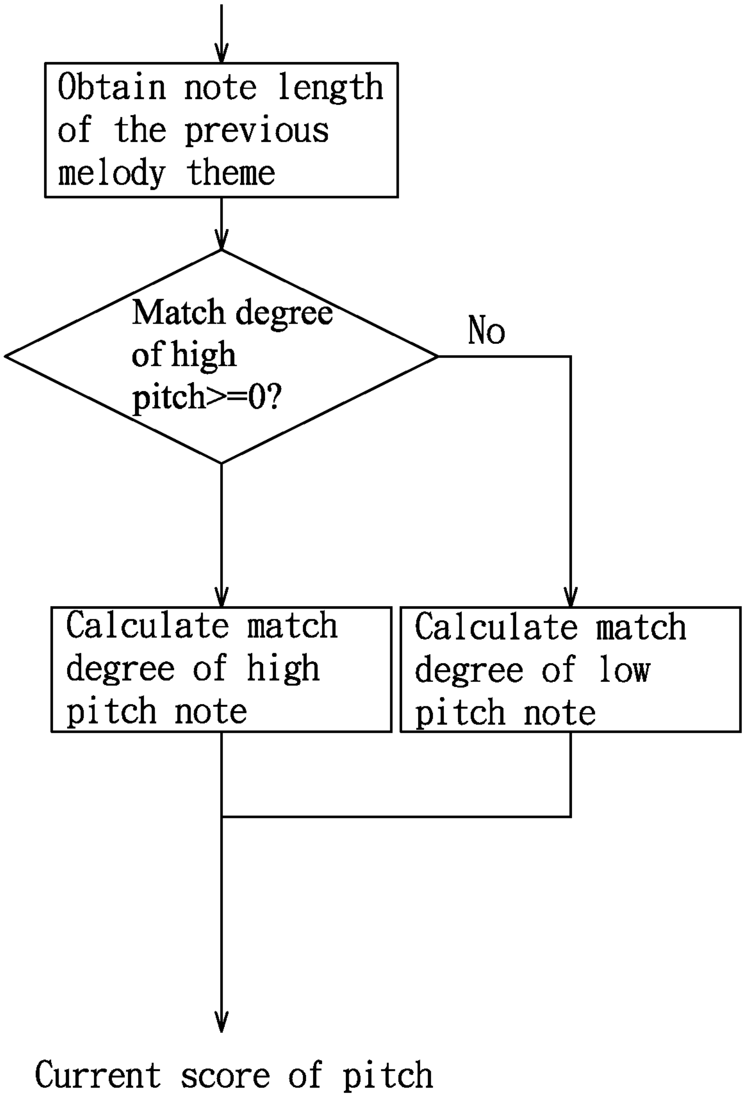
FIG. 3 is a third schematic diagram of the method to obtain score of pitch of the present invention.

Refer to FIG. 1, the pitch of the singer is calculated for a period of time (e.g. 0.1 s) since singing from the microphone frequency with the means of autocorrelation function, which is regarded as a way for voice fundamental frequency. After that, convert fundamental frequency to the relevant note by a pitch calculator, and then check the match degree between this note and the one obtained from the theme of a melody, mark the note a score of pitch. By this means, calculate scores of pitch of all the notes until the melody ends, and average the scores. For details, please refer to FIG. 2 and explanation below.

First of all, take the step of "Initial Parameters Set", the note number(n)=0, the match degree between voice and the high pitch of the note (Note Hit)=o, between the voice and the low pitch of the note (Note Hit Around)=0, here, Note Hit means the number of the time periods in which the voice pitch absolutely matches to the note during the singing, while Note Hit Around means the number of the time periods in which the voice pitch matches to the note in the range of 1 semitone during the singing. After that, try to obtain the note from the theme of the melody and calculate the voice pitch in the next period, and be noted that the note from the theme of the melody is gained directly from the midi document. Get the relevant note, and voice pitch (fundamental frequency) from the specific time, or convert to the note of the pitch by transcode table, for example, the frequency of tone "A4" is 440 Hz, and twice more for each octave; the frequency of note "A5" is 880 Hz, with 12 semitones for one octave, and the frequency between two semitones differs $2^{(1/12)}$ times, because in the condition that the voice and note frequency differs twice, ½ or other round numbers, the tone sensation shall be the same. Thus, for semitones among ±12, we adjusted the calculated voice note_p and the note from the theme of the melody Note_m, making the error among +6--5 semitones, that is Note_p=Note_p+12*I (I is a nonzero round number and −5<=Note_p−Note_m<=6). Following that, check whether it is a new tone, if yes, calculate the pitch score of the previous tone, and reset the initial parameters, take notice that NoteHit=0, NoteHitAround=0 and note number (n)=n+1; if no, check whether the note from the theme of the melody matches to the voice note, which means the error shall be very slight, such as 0.5 semitone, etc, if so, increase the match degree of the tone high pitch NoteHit=NoteHit+1; if not, check whether the note from the theme of the melody matches to the voice note low pitch, which means the error shall be very huge, such as 1 semitone, if so, increase match degree of the tone low pitch NoteHitAround=NoteHitAround+1. Finally, return to the tone from the theme of the melody to calculate the voice pitch. For the calculation method of the above "pitch score of the previous note", please refer to FIG. 3:

Obtain the Note Length (m) from the note of the melody theme first, here, $$m=0,1,2,\ldots,M$$

This M means the total number of the note. And then judge whether the high pich matching degree NoteHit is above zero, if so, calculate the matched score for the high pitch sensation note:

$$\text{Score of Pitch}(m)=\text{PSH}+K1*\text{NoteHit}(m)/\text{NoteLength}(m);$$

Here, PSH and K1 are adjustable empirical values. Otherwise, calculate the matched score for the low pitch sensation note:

$$\text{Score of Pitch}(m)=\text{PSL}-K2*\text{NoteHitAround}(m)/\text{NoteLength}(m);$$

Here, PSL and K2 are adjustable empirical values, and limited to:

$$0<=\text{Pitch Score}(m)<=100$$

Finally, check whether it is the last note, if not, repeat above processes; if yes, calculate the average score of pitch with a means of weighted average in a weighting ratio of Note Length (m) for all the Pitch Score(m), as follows:

Set total Note Length $NL=\square_{0\text{-}M\text{-}1}$, NoteLength(m), average SOP (score of pitch):

$$SOP=\frac{1}{NL}\sum_{m=0}^{M-1}PitchScore(m)\cdot NoteLength(m)$$

Figure 4:
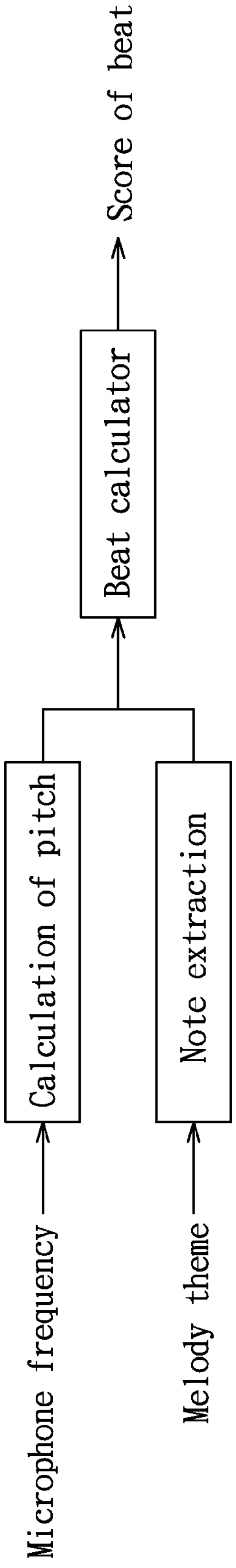
FIG. 4 is a first schematic diagram of the method to obtain score of beat of the present invention.

(2) Score of Beat:

Beat sensation depends on the match degree between voice beat start position and the melody theme start time, and between the voice beat end position and the melody theme end time. Here, an accurate beat position of each beat shall be obtained. Regard a singer's pitch change is the time change of different notes to decide the match degree of its beat. Similar to FIG. 1, FIG. 4 is also undertaken by the means of calculating the voice pitch and note of the melody theme first, and then obtain the average score of beat by beat sensation calculator.

Figure 5:
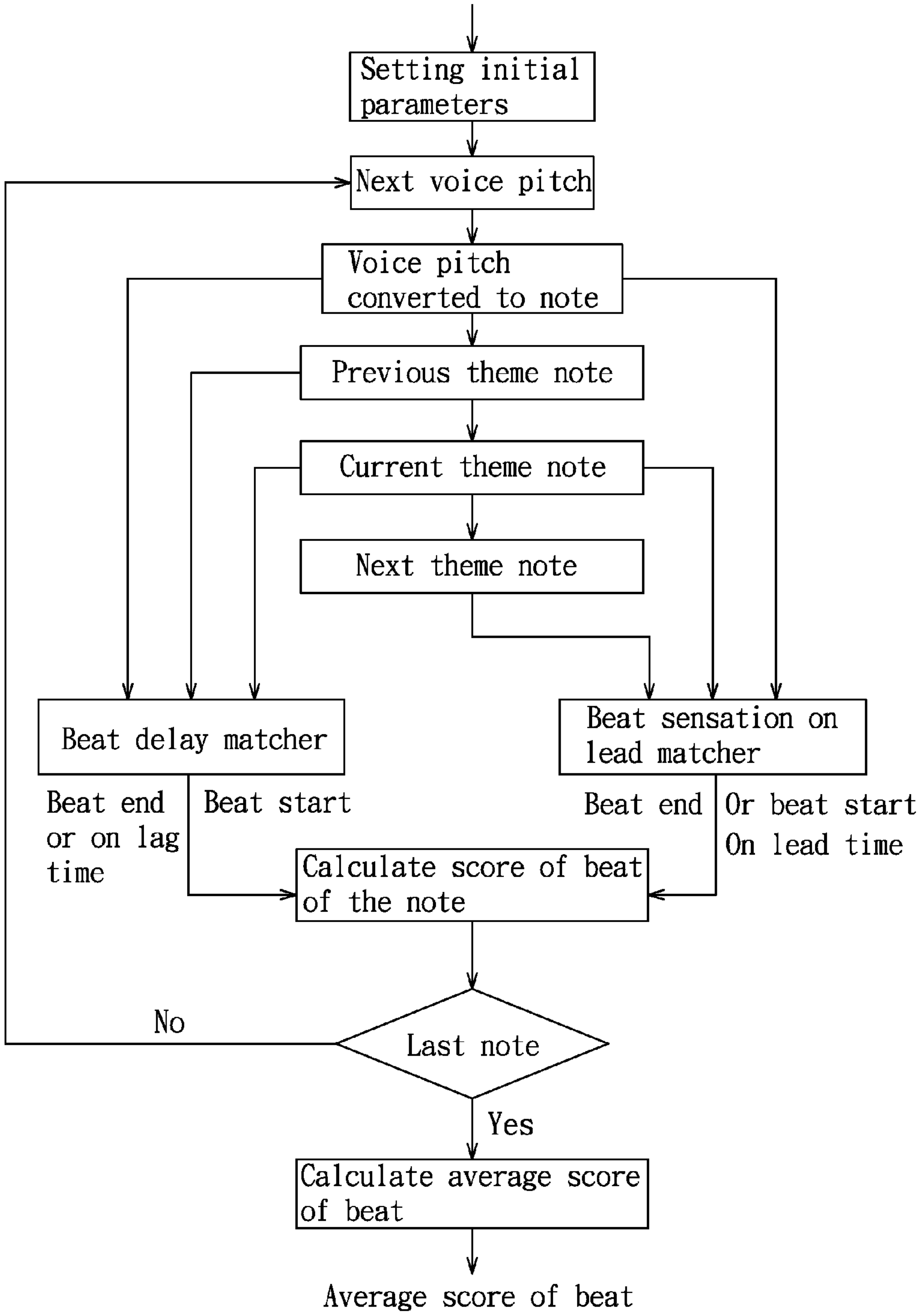
FIG. 5 is a second schematic diagram of the method to obtain score of beat of the present invention.

With the help of a beat sensation calculator, the voice pitch is converted to the relevant note, and compare the time error between this note and the note from the melody theme. Here, the error shall include the beat start and end positions, either on lead or on lag time. Also, record the time error of each note, and mark the note a score of beat. By this means, calculate all the beat scores of the note, until the melody ends, and average the scores. Just as shown in FIG. 5, a beat sensation on lag matcher or on lead matcher could be used to convert to the voice note, after that, according to the previous or next note of the melody theme, calculate the time match degree, on lead and on lag between the voice and the note, so as to get the beat ending on lag time and on lead time or beat starting; and still, through calculating the note score of beat, to obtain the beat score of the note. By this method, each beat error of each note shall be calculated since the very first note to the last note, and finally average the scores of beat.

Figure 6:
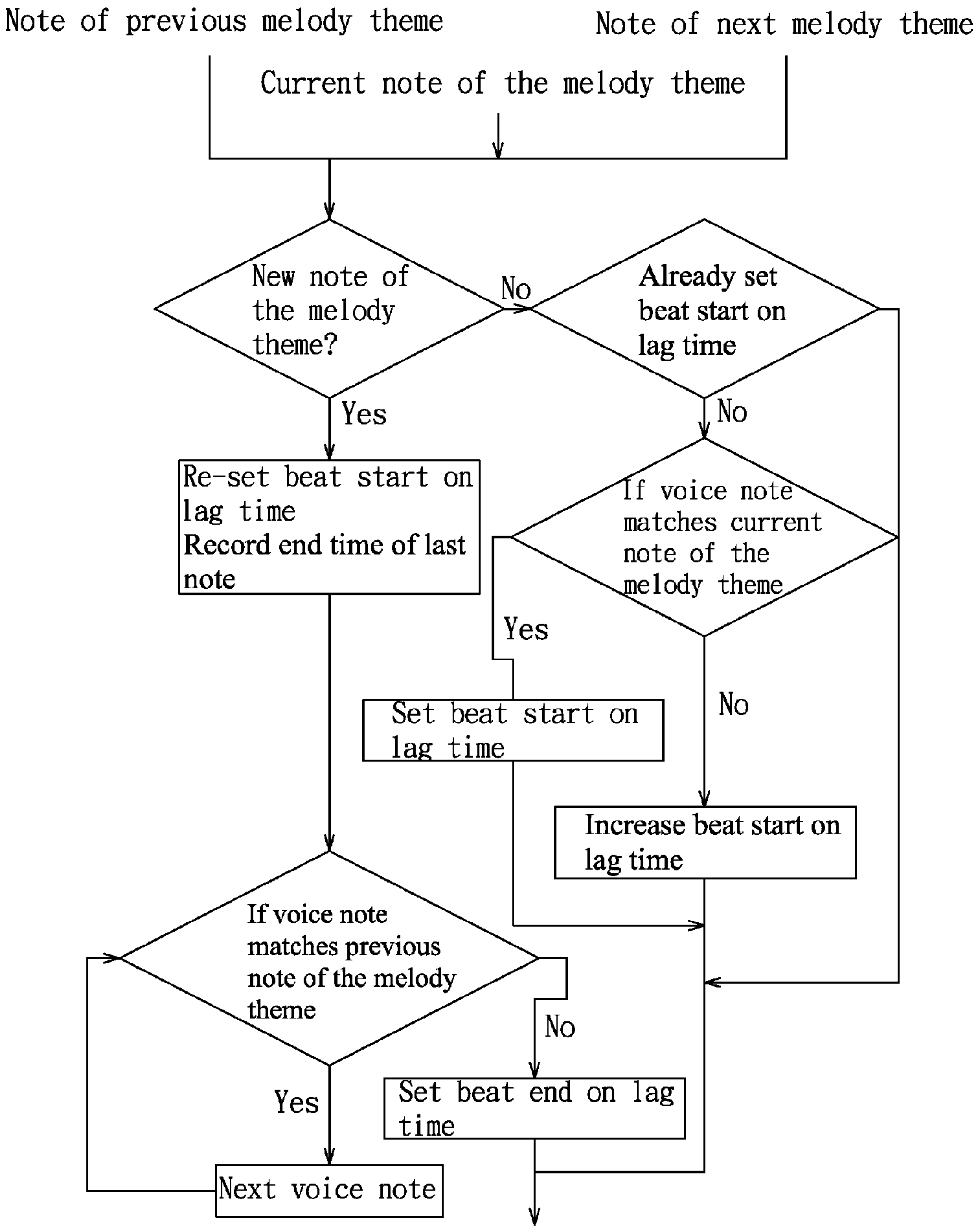
FIG. 6 is a third schematic diagram of the method to obtain score of beat of the present invention.

Referring to FIG. 6, check whether the note is new from a new melody before use the beat sensation on lag matcher, if not, see whether the beat start on lag time has been set, if yes, end. Otherwise, judge whether the voice pitch matches to the note, if not, increase beat start on lag time. If so, set the beat start on lag time, and then end. Here, the on lag time refers to the time error of voice starting later than the music note. If the note is of a new melody, reset the beat start on lag time and record the end time of previous note, and then check whether the voice note matches to the note of the previous melody theme, if so, judge whether the next voice note shall be matched to the note of the previous melody theme, until mismatch. After that, set the beat end on lag time, and end. Here, this on lag time refers to the time error of voice ending later than the music note ending.

Figure 7:
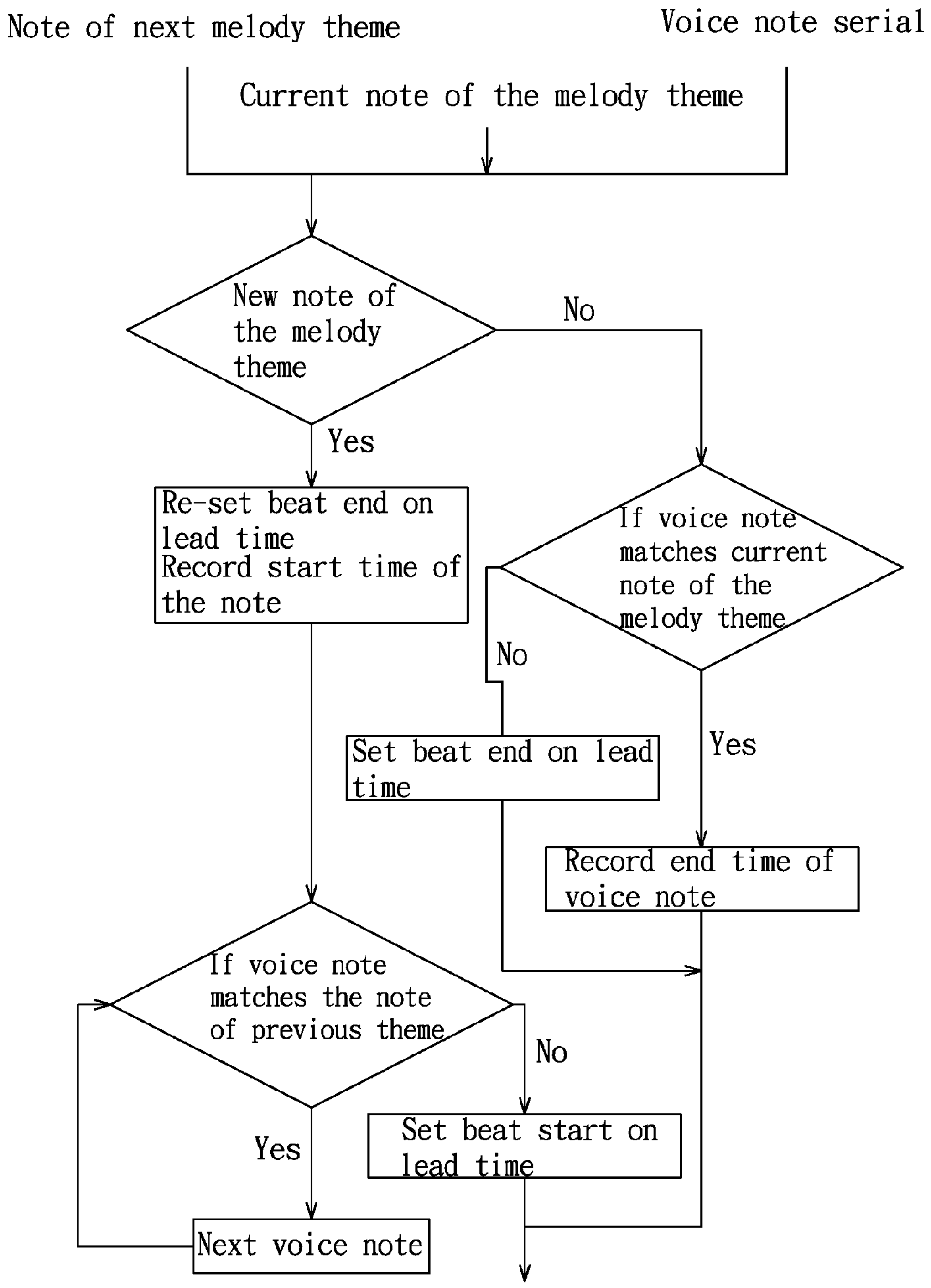
FIG. 7 is a fourth schematic diagram of the method to obtain score of beat of the present invention.

Referring to FIG. 7, check whether the note is new from a new melody before using the beat sensation on lead matcher, if not, see whether the voice note matches to the present music note. If so, record the voice note ending time. Otherwise, set the beat end on lead time, and end. Here, the on lead time refers to the time error of voice ending earlier than the music note ending. If the note is of a new melody, reset the beat end on lead time and record the starting time of the note, and then check whether the voice note matches to the note of the previous melody theme, if so, judge whether the next voice note shall be matched to the previous one, until mismatch. After that, set the beat start on lead time, and end. Here, this on lead time refers to the time error of voice starting earlier than the music note starting.

After that, calculate the SOB (Score of Beat) from the beat start on lag time, beat start on lead time, beat end on lag time and beat end on lead time, as follows:

Set time error of beat start as TDS, and the SOBS (Score of Beat Start):

$$\mathrm{SOBS}=As+100\cdot(1-TDS/Ls)$$

Here, TDS=beat start on lag time (Note On Lag)+beat start on lead time (Note On Lead). As and Ls are preset empirical values. Set time error of beat end as TDE, and the score of beat end shall be:

$$\mathrm{SOBE}=Ae+100\cdot(1-TDE/Le)$$

Here, TDE=beat end on off lag time (Note Off Lag)+beat end on lead time (Note Off Lead). Ae and Le are preset empirical values, the score of beat shall be:

$$\mathrm{SOB}=\mathrm{SOBS}\cdot R+\mathrm{SOBE}\cdot(1-R)$$

Here, R is a preset weighting parameter, and 0<=R<=1.

(3) Score of Emotion:

As emotion is a parameter hard to be evaluated by objective factors, here, we adopt the match degree of the average amplitude of voice and that of the melody theme. The average amplitude of voice is obtained from measuring RMS of voice sections, while the average amplitude of the melody theme is from measuring the RMS of each sound section of melody theme or from the amplitude parameter from the composed music. RMS is calculated as follows:

$$RMS=\sqrt{\frac{1}{K}\sum_{i=0}^{K-1}x^2(i)}$$

Figure 8:
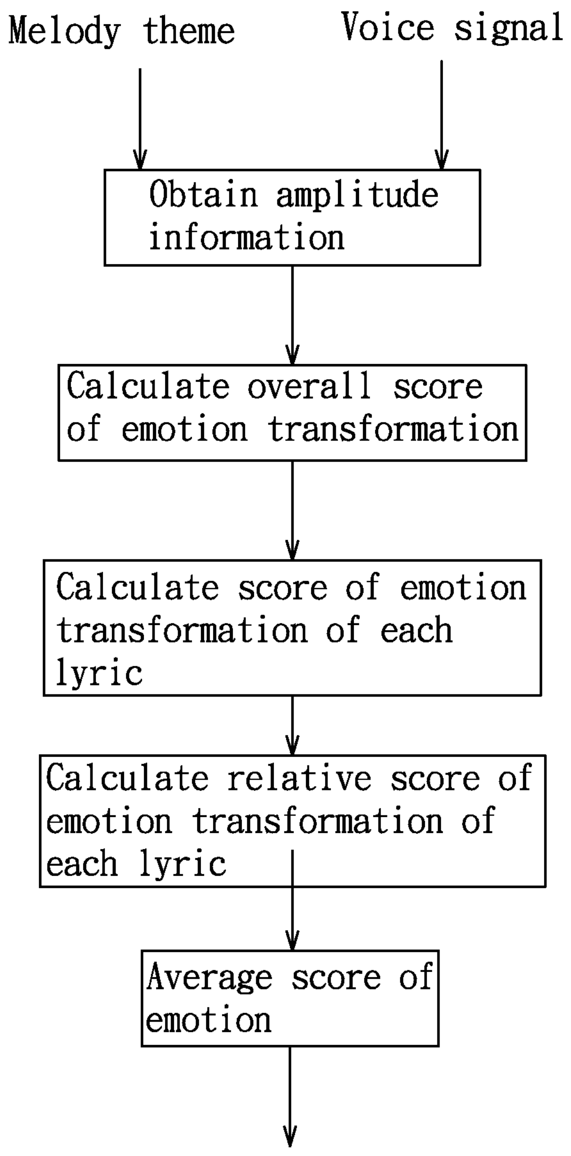
FIG. 8 is a schematic diagram of the method to obtain score of emotion of the present invention.
Figure 9:
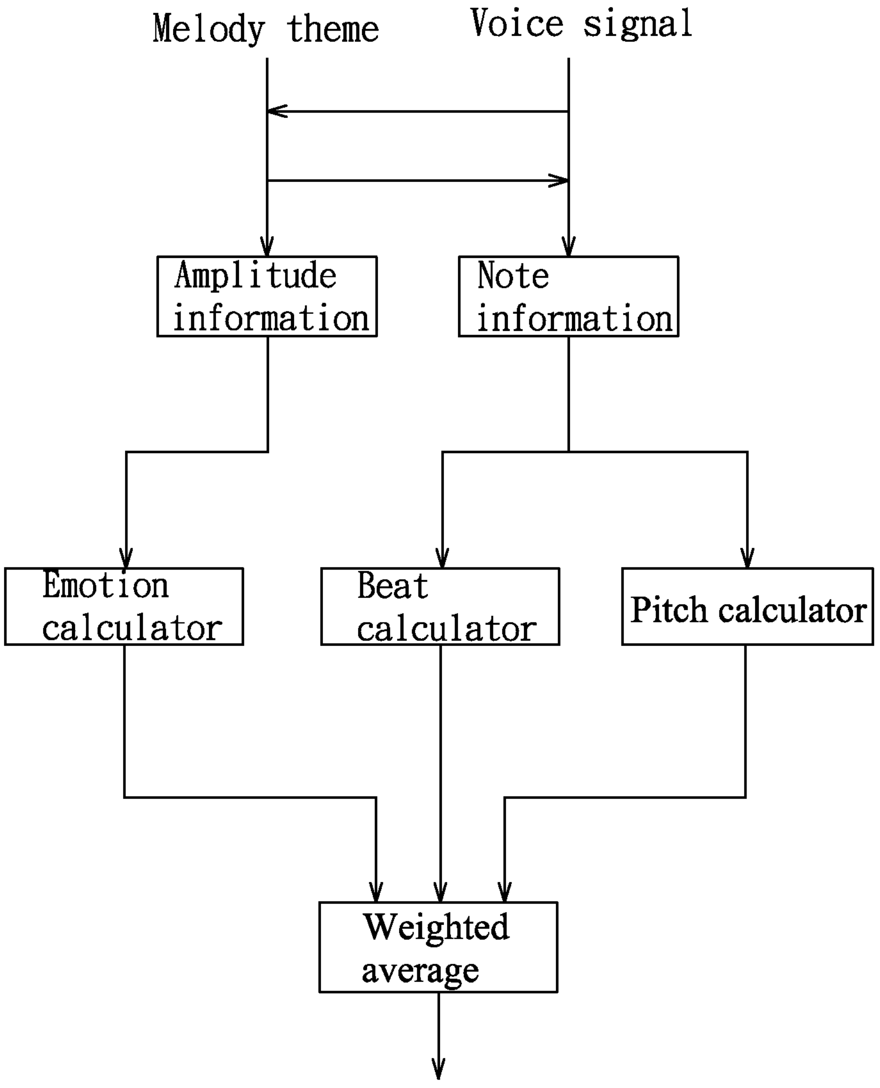
FIG. 9 is a schematic diagram of the Automatic Marking Method of the present invention.

Here, x(i), i=0, 1, . . . , K−1, K, refers to the sound samples in this section. Actually, this RMS could be replaced by other methods, such as average amplitude or maximum amplitude, etc. Referring to FIG. 8, calculate the RMS of voice signal and melody theme a while (e.g. 0.1 s) since beginning by score of emotion calculator, and then obtain the RMS list of voice and music, say MicVol(n) and MelVol(n), n=0, 1, N−1 . . . , respectively, meaning the RMS in number n time period, in which N refers to the total length of the melody, and adjust the MicVol (n) exactly same as MelVol (n), and then average it according to each note length to get the average list of voice and music in number m note as AvgMelVol (m) and AvgMicVol (m). The score of emotion could be calculated by AvgMelVol (n) and AvgMicVol (n), through firstly measuring the overall match degree between voice amplitude curve and music amplitude curve, SOET, which could also be said as overall score of emotion transformation, as follows:

$$SOET=\frac{\left(\sum_{m=0}^{M-1}AvgMicVol(m)AvgMelVol(m)\right)\times 100}{\sqrt{\left(\sum_{m=0}^{M-1}AvgMicVol^2(m)\right)\left(\sum_{m=0}^{M-1}AvgMelVol^2(m)\right)}}$$

Here, M refers to the total number of notes, and $$\left(\sum_{m=0}^{M-1}AvgMicVol(m)AvgMelVol(m)\right)^2<=\left(\sum_{m=0}^{M-1}AvgMicVol^2(m)\right)\cdot\left(\sum_{m=0}^{M-1}AvgMelVol^2(m)\right)$$

Thus SOET<=100.

Then, calculate SOMS of each lyric, first divide AvgMicVol(m) and AvgMelVol(m) to sentences, and set the start note of each lyric shall be S(j), j=0, 1, 2, . . . , L−1, in which L refers to the total lyrics, and set S(L)=M, and the score of emotions shall be:

$$SOES(j)=\frac{\left(\sum_{m=S(j)}^{S(j+1)-1}AvgMicVol(m)AvgMelVol(m)\right)\times 100}{\sqrt{\left(\sum_{m=S(j)}^{S(j+1)-1}AvgMicVol^2(m)\right)\left(\sum_{m=S(j)}^{S(j+1)-1}AvgMelVol^2(m)\right)}}$$

Set j=0, 1, 2, . . . , L−1, and calculate the relative score of emotions, which shall be volume of each lyrics relative to the overall volume transformation:

First of all, set $$A'(j)=\frac{\left(\sum_{m=S(j)}^{S(j+1)-1}AvgMicVol(m)AvgMelVol(m)\right)}{\left(\sum_{m=S(j)}^{S(j+1)-1}AvgMicVol^2(m)\right)}$$

$$A=\frac{\left(\sum_{m=0}^{M-1}AvgMicVol(m)AvgMelVol(m)\right)}{\left(\sum_{m=0}^{N-1}AvgMicVol^2(m)\right)}$$

so $$SOEA(j)=\begin{cases}\frac{A'(j)}{A}\cdot 100,\ A'<A\\ \frac{A}{A'(j)}\cdot 100,\ A'\geq A\end{cases}\quad j=0,1,2,\ldots,L-1$$

Calculated from the above, the average score of emotion shall be:

$$SOE=\alpha\cdot SOET+\frac{1}{L}\sum_{j=0}^{L-1}(\beta\cdot SOES(j)+\gamma\cdot SOEA(j))$$

Here, α, β and γ are weighting coefficients, and α+β+γ=1.

(IV) Average Evaluated Score: (refer to FIG. 9).

The Average Evaluated Score (AES) could be obtained from the above-mentioned SOP, SOB and SOE.

$$\mathrm{AES}=p\cdot\mathrm{SOP}+q\cdot\mathrm{SOB}+r\cdot\mathrm{SOE}$$

Here, p, q and r are weighting coefficients, and p+q+r=1.

Example

Figure 10:
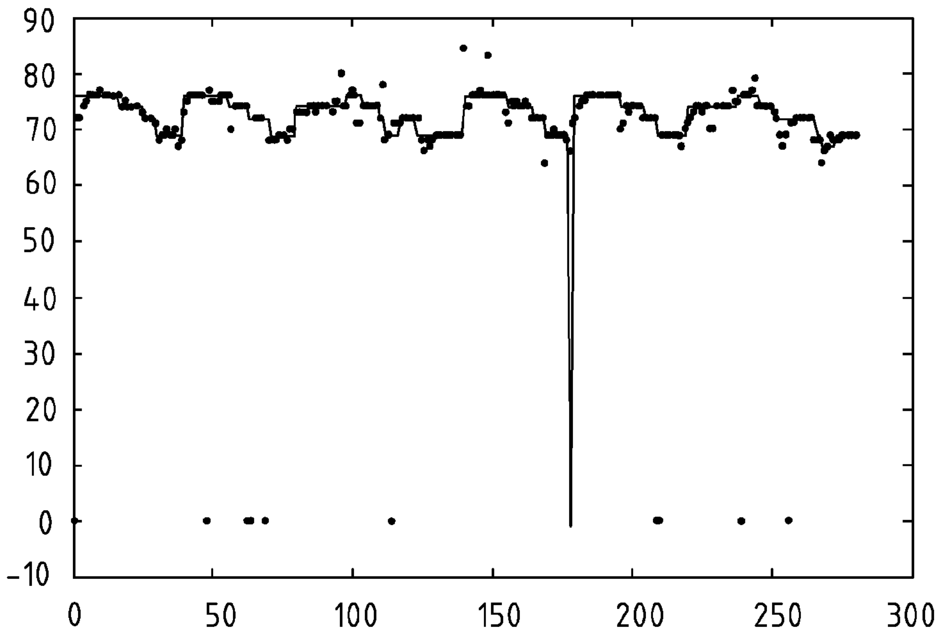
FIG. 10 shows Example Reference Chart I of the present invention.
Figure 11:
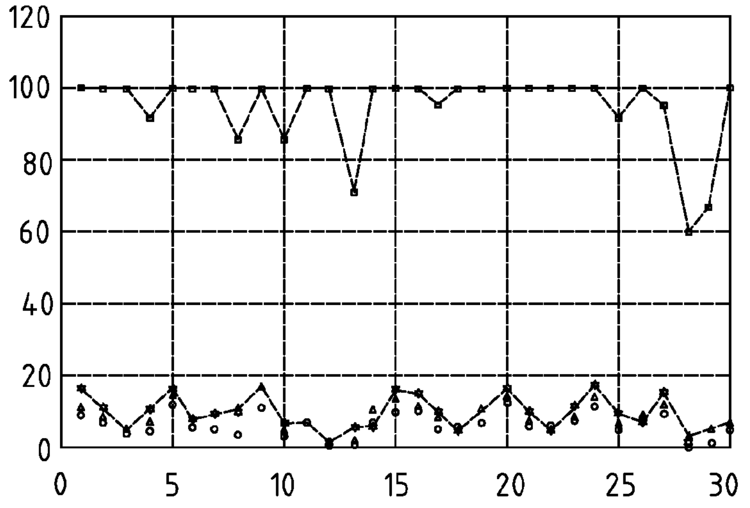
FIG. 11 shows Example Reference Chart II of the present invention.
Figure 12:
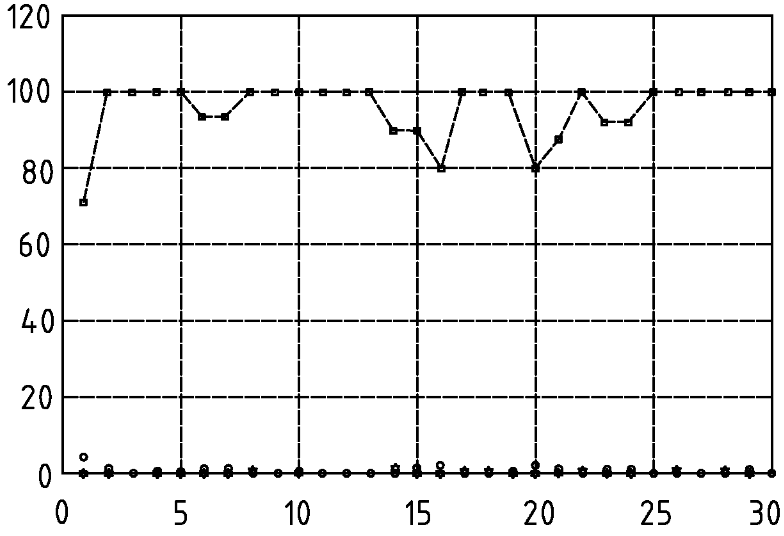
FIG. 12 shows Example Reference Chart III of the present invention.
Figure 13:
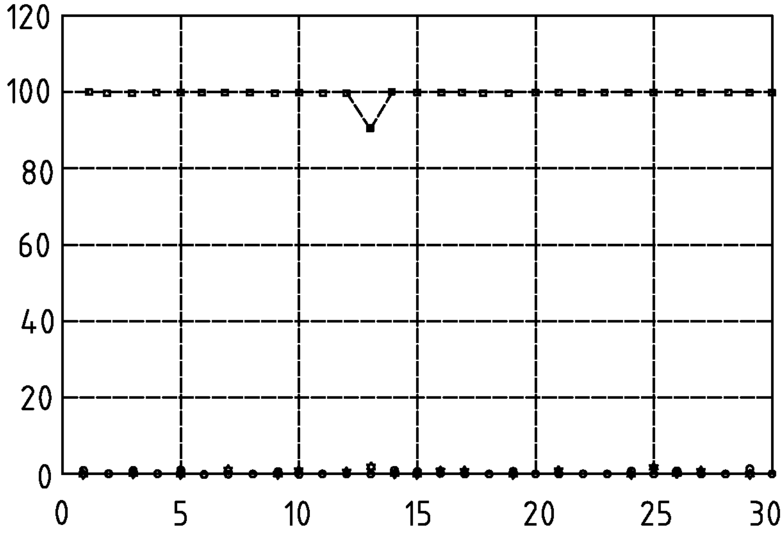
FIG. 13 shows Example Reference Chart IV of the present invention.

Take a melody as an example. We shall calculate the micpitch (n) and MicVol(n) every 0.1 s, and also the MelNote (n) and MelVol(n) at the same time, here, n=0, 1, 2, . . . , N, N refers to the length of the melody. For particular explanation, we take N=280 to say the melody length is 28 seconds. FIG. 10 shows the curves of MicPitch(n) and MelNote(n), in which the real line represents the MelNote(n), direct-axis as pitch code, and the interval between each round number is 1 semitone, 60 as alto voice Do, 61 as alto voice rising Do, 69 as alto voice La, and so on. Round dot as micpitch (n), the real lines is divided into several parts, and each part refers to a persistent note, and high-low means that of the note; when the MelNote (n) is −1, the note shall be a pause or empty note, ignored; if there is no round dot, no micpitch is calculated, it could be soundless, silent or noise, etc, and be regarded as no sound.

By above-mentioned means, the NoteHit (m) of number m note and the NoteHitAround (m) (see circular in FIG. 11), here, m=0, 1, 2, . . . M, M=3, and set PSH=50, K1=100 and PSL=35, K2=50, get the score of pitch of each note m (see square in FIG. 11), get the average score of pitch as 98 by weighting calculating the note length (see star in FIG. 11).

According to the calculations in score of beat, the NoteOnLag (m) (round) and NoteOnLead (m) (star) of note number m could be obtained, set As=10 and Ls=10 to calculate the BeatOnScore(m) (square). See FIG. 12, pick out the NoteOffLag (m) (round) and NoteOffLead (m) (star), set Ae=50, Le=NoteLength and get BeatOffScore(m) (round). See FIG. 13, obtain ScoreOfBeatStart (SOBS)=93.19, ScoreOfBeatEnd (SOBE)=99.82, set R=0.5 and SOB=96.5 by weighting calculating the note length.

Figure 14:
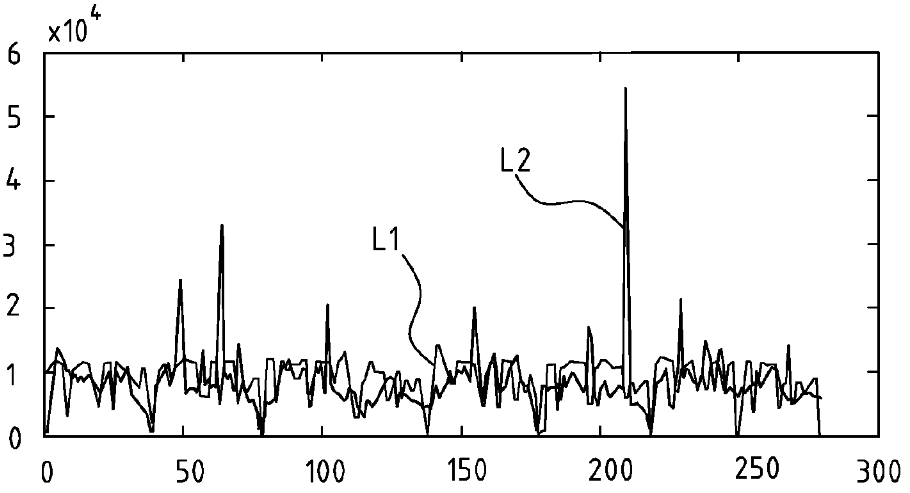
FIG. 14 shows Example Reference Chart V of the present invention.
Figure 15:
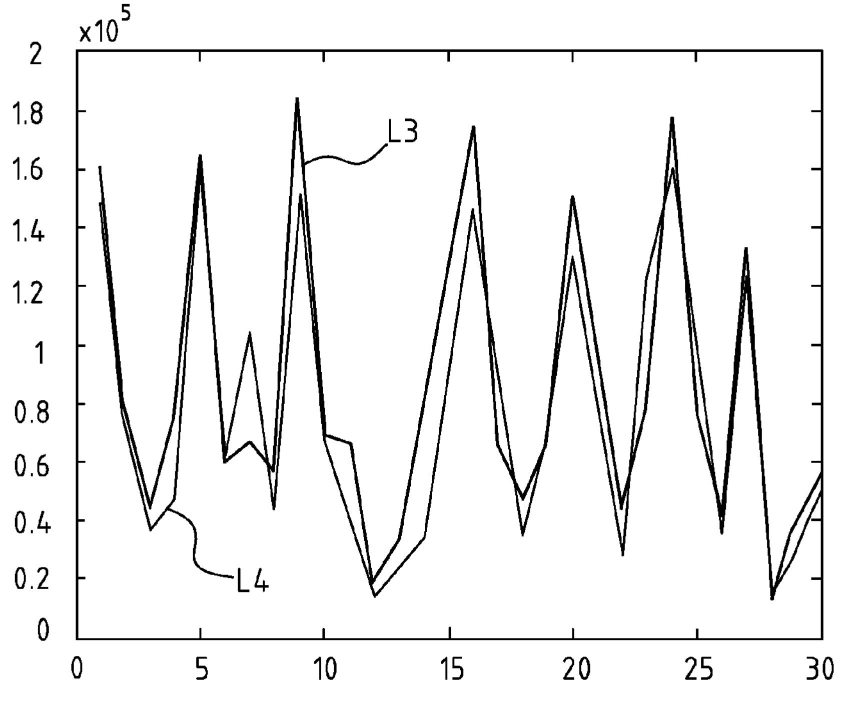
FIG. 15 shows Example Reference Chart VI of the present invention.
Figure 16:
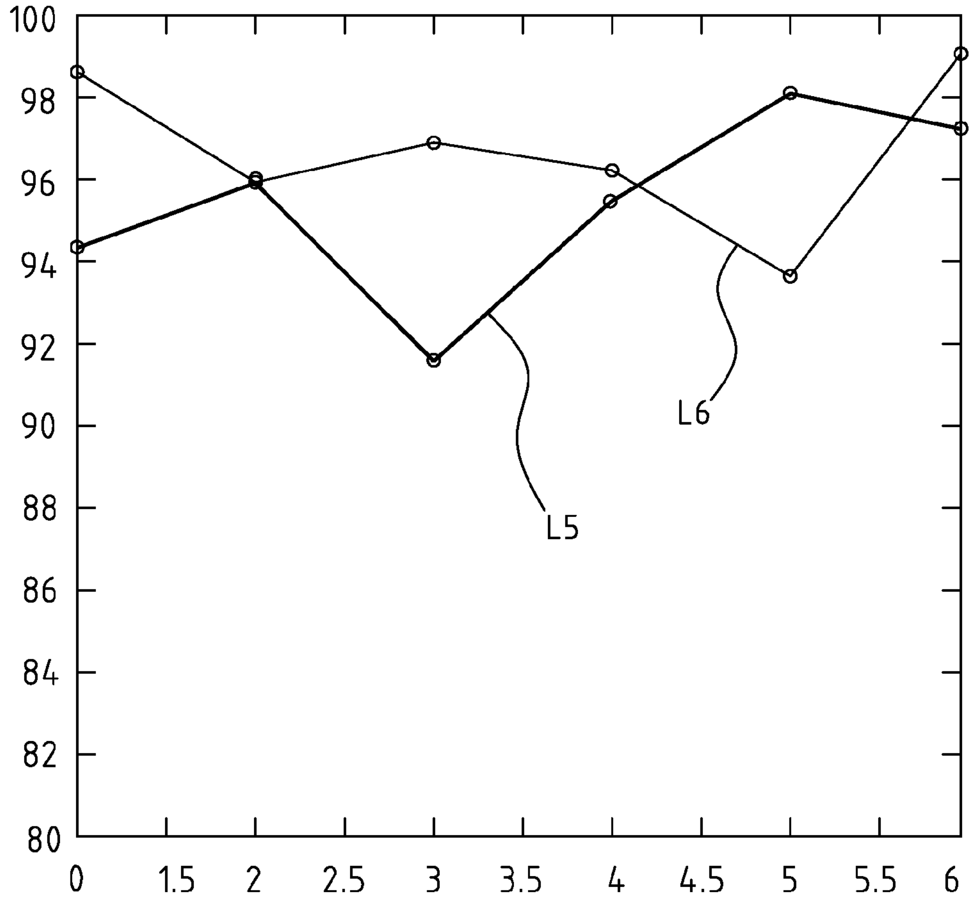
FIG. 16 shows Example Reference Chart VII of the present invention.

According to the calculations in score of emotion, get the RMS lists of voice and melody theme as MelVol (n) (see L1 in FIG. 14) and MicVol (n) (see L2 in FIG. 14), and adjust the MicVol (n) exactly same as MelVol (n), see FIG. 14, and then average it according to each note length to get the average RMS list in number m note as AvgMelVol (m) (see L3 in FIG. 15) and AvgMicVol (m) (see L4 in FIG. 15). According to FIG. 15, set the weighting coefficient, and get the SOET=98.33, SOES(j) (see L5 in FIG. 16) and SOEA (j) (see L6 in FIG. 16), here, j=0, 1, 2, . . . L−1, and the total lyric L=6. From FIG. 16, the average SOES=97.2 and SOEA=95.67, and by weighting calculating, it shall be:

ScoreOfEmotion (SOE)=97.24

Finally, set weighting coefficient as p=0.6, q=0.2 and r=0.2, the AES shall be:

$$AES=p\cdot SOP+q\cdot SOB+r\cdot SOE=97.55$$

I claim:

1. An automatic marking method for Karaoke vocal accompaniment, the method comprising:

comparing pitch, beat position and volume of a singer with an original pitch, beat position and volume of the theme of a song so as to generate a score for the tone sensation, a score for beat sensation and a score of emotion and to obtain weighted total score;

obtaining a score of sensation by estimating the pitch of the singer from a microphone volume at selected time periods so as to derive a fundamental frequency of the voice;

converting the fundamental frequency to a relevant note by a tone sensation calculator;

checking a match degree between the relevant note and a note obtained from the theme of a melody so as to note a tone sensation score;

calculating score of pitch for all notes until the melody ends;

averaging the calculated scores, the step of obtaining a tone sensation score comprising:

setting of initial parameters by setting an initial note number m=0, the match degree between the voice and a high pitch of a note NoteHit=0, and between the voice and a low pitch of the note NoteHitAround=0, the NoteHit is a number of time periods in which the voice absolutely matches the desired note during singing, NoteHitAround is a number of time periods in which voice pitch various from the desired note within a range of one semitone during the singing;

obtaining a note from the theme of the melody;

calculation a voice pitch for the next period; and deciding a sensation score algorithm for the note by NoteHitAround and NoteLength, the step of obtaining a beat sensation score involves matching a degree between a voice beat start position and a melody theme start time and between a voice beat end position and a melody theme end time, the step of obtaining a beat sensation score comprising:

converting the voice pitch to a relevant note with a beat sensation calculator;

comparing a time error between the relevant note and the note from the melody theme, the time error including the beat start position and the beat end position;

recording the time error of each note;

marking the beat score of the beat;

calculating all of the beat scores until the melody ends;

averaging the beat scores;

converting the beat sensation on a lag matcher or on a lead matcher to the voice note;

calculating a lead time match degree and a lag time match degree according to the previous note or a next note of the melody theme so as to obtain a lag time or a lead time on a beat ending or a beat starting;

obtaining a beat score of the note by calculating the note score of the beat;

calculating each beat error of each note from a first note and a last note;

averaging the scores of the beats, the step of generating a score for emotion involving matching a degree of an average amplitude of the voice and the melody theme, the step of generating a score for emotion comprising:

measuring Root Mean Square (RMS) of voice sections to obtain an average amplitude of voice;

measuring the RMS of each sound section of the melody theme or by an amplitude parameter from the composed music so as to obtain an average amplitude of the melody theme;

calculating the RMS of a voice signal and a melody theme by an emotion score calculator;

obtaining an RMS list of voice and music;

averaging the RMS list of voice and music according to each note length so as to produce an average RMS list of voice and music;

calculating an emotion score by obtaining and calculating the match degree of voice amplitude curves and melody theme amplitude curves during the entire song and each lyric and a change scope of amplitude of each lyric in relation to overall amplitude so as to produce a gain average emotion score.

2. The automatic marking method of claim 1, wherein if the high pitch matching degree NoteHit is larger than zero, it is required to calculate the matched score for the high pitch sensation note in mth high pitch sensation note (hereinafter referred to as PithScore(m)):

$$PitchScore(m)=PSH+K1*NoteHit(m)/NoteLength(m)$$

where, PSH and K1 are adjustable empirical values; therewise, calculate the matched score for the low pitch sensation note:

$$PitchScore(m)=PSL+K2*NoteHitAround(m)/NoteLength(m)$$

where, PSL and K2 are adjustable empirical values, and limited to:

$$0<=PitchScore(m)<=100$$

finally, judge if it is the last note, if not, repeat above processes; if yes, calculate the average score of pitch by weighted averaging of Note Length (m) for all the Pitch Score(m) as follows:

set total Note Length NL= $\sum_{m=0\sim M-1}$ NoteLength (m), average SOP (score of pitch)

$$SOP = \frac{1}{NL}\sum_{m=0}^{M-1} PitchScore(m)\cdot NoteLength(m)$$

calculate the SOB (Score of Beat) as follows:
set the time error of beat start as TDS, and the SOBS (Score of BeatStart):

$$SOBS=As+100\cdot(1-TDS/Ls)$$

where, TDS=beat start on lag time (Note On Lag)+beat start on lead time (Note On Lead); as and Ls are preset empirical values; set time error of beat end as TDE, and the score of beat end (SOBE) shall be:

$$SOBE=Ae+100\cdot(1-TDE/Le)$$

where, TDE=beat end on off-lag time (Note Off Lag)+beat end on lead time (Note Off Lead);
Ae and Le are preset empirical values, the score of beat (SOB) shall be:

$$SOB=SOBS\cdot R+SOBE\cdot(1-R)$$

where, R is a preset weighting parameter, and 0<=R<=1;
assume the voice amplitude and theme of melody amplitude list in $n^{th}$ time period are MicVol(n) and MelVol(n), n=0, 1, N−1 respectively, of which N is the total time length of the melody, then average it according to each note length to get the average list of voice and music in $m^{th}$ note as AvgMelVol (m) and AvgMicVol (m) as follow:

$$AvgMelVol(m) = \frac{1}{L_m}\sum_{n=n_m}^{n_m+L_m-1} MelVol(n)$$

$$AvgMicVol(m) = \frac{1}{L_m}\sum_{n=n_m}^{n_m+L_m-1} MicVol(n)$$

where $L_m$ is note length of $m^{th}$ note, $n_m$ is the time period when $m^{th}$ note starts; the score of emotion (Score of Emotion) is calculated by AvgMelVol (n) and AvgMicVol (n), by firstly measuring the overall match degree between voice and music amplitude curves; SOET represents overall score of emotion change as follows:

$$SOET = \frac{\left(\sum_{m=0}^{M-1} AvgMicVol(m)AvgMelVol(m)\right)\times 100}{\sqrt{\left(\sum_{m=0}^{M-1} AvgMicVol^2(m)\right)\left(\sum_{m=0}^{M-1} AvgMelVol^2(m)\right)}}$$

where, M is the total number of notes, and $$\left(\sum_{m=0}^{M-1} AvgMicVol(m)AvgMelVol(m)\right)^2 <= \left(\sum_{m=0}^{M-1} AvgMicVol^2(m)\right)\cdot\left(\sum_{m=0}^{M-1} AvgMelVol^2(m)\right)$$

so, SOET<=100;
then, calculate SOES of each lyric; firstly, divide AvgMicVol (m) and AvgMelVol(m) to lyrics, and assume the start note of each lyric shall be S(j), j=0, 1, 2, . . . , L−1, of which L is the total lyrics, and set S(L)=M, the score of emotions shall be:

$$SOES(j) = \frac{\left(\sum_{m=S(j)}^{S(j+1)-1} AvgMicVol(m)AvgMelVol(m)\right)\times 100}{\sqrt{\left(\sum_{m=S(j)}^{S(j+1)-1} AvgMicVol^2(m)\right)\left(\sum_{m=S(j)}^{S(j+1)-1} AvgMelVol^2(m)\right)}}$$

set j=0, 1, 2, . . . , L−1, and calculate the relative score of emotion changes for every lyric, which shall be volume variations of each lyric relative to overall volume transformation: first, set:

$$A'(j) = \frac{\left(\sum_{m=S(j)}^{S(j+1)-1} AvgMicVol(m)AvgMelVol(m)\right)}{\left(\sum_{m=S(j)}^{S(j+1)-1} AvgMicVol^2(m)\right)}$$

$$A = \frac{\left(\sum_{m=0}^{M-1} AvgMicVol(m)AvgMelVol(m)\right)}{\left(\sum_{m=0}^{N-1} AvgMicVol^2(m)\right)}$$

then $$SOEA(j) = \begin{cases} \frac{A'(j)}{A}\cdot 100, & A' < A \\ \frac{A}{A'(j)}\cdot 100, & A' \geq A \end{cases} \quad j = 0, 1, 2, \ldots, L-1$$

calculated from the above, the average score of emotion shall be weighted average of overall emotion transformation score, emotion transformation score and relative emotion transformation score of each lyric:

$$SOE = \alpha\cdot SOET + \frac{1}{L}\sum_{j=0}^{L-1}(\beta\cdot SOES(j) + \gamma\cdot SOEA(j))$$

where, α, β and γ are weighting coefficients, and α+β+γ=1;
the AES (Average Evaluated Score) could be obtained from the above-mentioned SOP, SOB and SOE as follow:

$$AES=p\cdot SOP+q\cdot SOB+r\cdot SOE$$

where, p, q and r are weighting coefficients, and p+q+r=1.

* * * * *